United States Patent
English

(10) Patent No.: US 6,950,731 B1
(45) Date of Patent: Sep. 27, 2005

(54) TRAFFIC PATTERN APPROACH COMPUTER

(76) Inventor: Cody Mac English, 10325 Cypresswood Dr. APT 834, Houston, TX (US) 77070

( * ) Notice: Subject to any disclaimer, the term of this patent is extended or adjusted under 35 U.S.C. 154(b) by 0 days.

(21) Appl. No.: 10/906,038

(22) Filed: Jan. 31, 2005

(51) Int. Cl.$^7$ ............................................. G01C 21/20
(52) U.S. Cl. ........................ 701/16; 701/120; 701/224; 701/225; 33/1 SD; 33/431; 235/61 B; 235/61 NV; 235/78 N; 235/78 R
(58) Field of Search ........................... 701/14–15, 120, 701/224–225; 33/1 SD, 431, 355 R, 356–359; 235/78 N, 78 R, 61 B, 61 NV; 342/450, 342/456; 340/954, 973, 979; G01C 21/20

(56) References Cited

U.S. PATENT DOCUMENTS

| | | | |
|---|---|---|---|
| 2,996,242 A | | 8/1961 | Bannister .................. 235/61 S |
| 3,100,601 A | | 8/1963 | Shapiro .................... 235/61 B |
| 3,865,477 A | * | 2/1975 | Gast ............................ 353/11 |
| 4,274,204 A | | 6/1981 | Self .......................... 33/1 SD |
| 4,802,283 A | * | 2/1989 | Trump ......................... 33/431 |
| 4,866,852 A | * | 9/1989 | Plier ............................ 33/431 |
| 5,248,007 A | * | 9/1993 | Watkins et al. ............ 180/9.32 |
| 5,461,792 A | | 10/1995 | Hill |
| 5,487,116 A | * | 1/1996 | Nakano et al. ............. 382/104 |
| 5,521,817 A | * | 5/1996 | Burdoin et al. ................ 701/3 |
| 5,640,323 A | * | 6/1997 | Kleimenhagen et al. ....... 701/1 |
| 5,642,093 A | * | 6/1997 | Kinoshita et al. ........... 340/439 |
| 5,646,843 A | * | 7/1997 | Gudat et al. ................... 701/3 |
| 5,646,845 A | * | 7/1997 | Gudat et al. .................. 701/41 |
| 5,757,949 A | * | 5/1998 | Kinoshita et al. ........... 382/104 |
| 6,134,796 A | * | 10/2000 | Johnson ........................ 33/457 |
| 6,157,891 A | * | 12/2000 | Lin ............................ 701/301 |
| 6,167,627 B1 | * | 1/2001 | Wilder et al. .............. 33/1 SD |
| 6,405,125 B1 | * | 6/2002 | Ayed .......................... 701/200 |
| 6,470,242 B1 | * | 10/2002 | Rudow et al. .................. 701/1 |
| 6,486,799 B1 | * | 11/2002 | Still et al. .................... 340/974 |
| 6,526,335 B1 | * | 2/2003 | Treyz et al. ................... 701/1 |
| 6,594,582 B1 | * | 7/2003 | Quinn ........................ 701/213 |
| 6,650,975 B2 | * | 11/2003 | Ruffner |
| 6,711,474 B1 | * | 3/2004 | Treyz et al. ................... 701/1 |
| 6,711,475 B2 | * | 3/2004 | Murphy |
| 6,862,500 B2 | * | 3/2005 | Tzamaloukas ................. 701/1 |
| 2002/0049517 A1 | * | 4/2002 | Ruffner ......................... 701/1 |
| 2002/0069019 A1 | * | 6/2002 | Lin ............................ 701/301 |
| 2002/0198632 A1 | * | 12/2002 | Breed et al. .................... 701/1 |
| 2003/0036827 A1 | * | 2/2003 | Murphy ......................... 701/3 |
| 2003/0093187 A1 | * | 5/2003 | Walker .......................... 701/1 |
| 2004/0107028 A1 | * | 6/2004 | Catalano ........................ 701/2 |
| 2004/0230345 A1 | * | 11/2004 | Tzamaloukas ................. 701/1 |

OTHER PUBLICATIONS

Unknown, An overview of the Boeing 717 published in Aero No.1, 1/1998 with 6 pages about Boeing 717 flight deck emenities, from http://www.boeing.com/commercial/aeromagazine/aero_03/ps/ps02/story.html.*

Suzan Koppei, An overview of the Boeing 717—Advanced Flight Deck, from http://www.boeing.com/commercial/aeromagazine/aero_03/textonly/ps02txt.html., Jan. 1998.*

* cited by examiner

Primary Examiner—Cuong H Nguyen

(57) ABSTRACT

A mechanical computer used in tandem with a GPS to approach, enter and fly the traffic pattern of any uncontrolled airport. Pilots must navigate to a relatively small area or approach point before entering the traffic pattern of an uncontrolled airport. While airports are programmed into GPS units, the approach points are not. The computer works in tandem with an onboard GPS unit programmed for navigation direct to the airport of intended landing and employs triangulation to navigate to an approach point from which a proper traffic pattern entry can be made.

16 Claims, 4 Drawing Sheets

TRAFFIC PATTERN APPROACH COMPUTER

BACKGROUND OF THE INVENTION

1. Field of Invention

This invention generally relates to airplane navigation, specifically to a handheld mechanical computer which works in tandem with an onboard GPS unit for navigating to, entering, and flying the traffic pattern of any uncontrolled airport.

2. Prior Art

Figure 7:
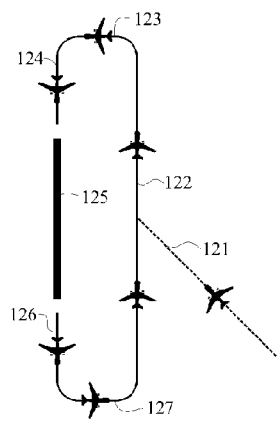
Figure 8:
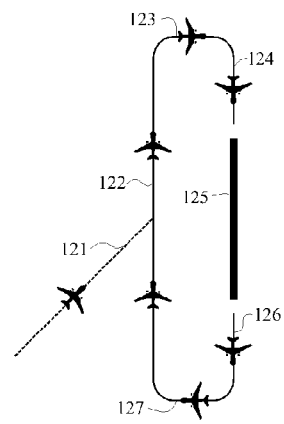

The Global Positioning System has provided a revolution in aircraft navigation giving pilots the ability to precisely navigate direct to any airport using an onboard GPS receiver. Unfortunately, pilots need additional navigational guidance beyond direct to the airport during a visual approach to an uncontrolled airport. Pilots approaching an uncontrolled airport are encouraged to make a "preferred traffic pattern entry" in order to provide for an orderly traffic flow in the traffic pattern and minimize the chances of a collision. In addition to aircraft approaching and departing an airport, frequently there are aircraft making multiple loops in the traffic pattern practicing takeoffs and landings. An illustration of the traffic pattern and the preferred traffic pattern entry is shown in FIG. 7. The traffic pattern is comprised of five legs; the departure leg 126, the crosswind leg 127, the downwind leg 122, the base leg 123, and the final approach leg 124. FIG. 7 illustrates a left traffic pattern as turns are made to the left in the pattern. Although the majority of runways have left traffic, some runways have right traffic. FIG. 8 illustrates a right traffic pattern as turns are made to the right in the pattern. Note that the right traffic pattern is a mirror image of the left traffic pattern.

The preferred traffic pattern entry requires that pilots enter the downwind leg of the traffic pattern at midfield approximately ½ to ¾ miles from the runway at a 45 degree angle. The pilot should be established on the 45 degree intercept course several miles from the airport. Although the minimum actual distance from the airport that the pilot should be established on the 45 degree intercept course is left to the pilot's discretion, three miles is believed to be a good rule of thumb. From the above description of the preferred traffic pattern entry, it is shown that there is an approach point that a pilot must navigate to in order to make a proper traffic pattern entry. The preferred traffic pattern entry or "45 entry" is illustrated by the course line 121 on FIG. 7.

Writings on entering and flying the traffic pattern do not actually refer to an approach point that should be flown to prior to making the preferred traffic pattern entry. Nonetheless, the definition of the preferred traffic pattern entry requires pilots to navigate to a relatively small area or point prior to making the preferred traffic pattern entry. This point will subsequently be referred to as the "pattern approach point".

Pilots can easily navigate direct to airports using GPS as GPS units are programmed with the location or coordinates of all public use airports. The pilot simply enters the identifier for the airport and the GPS provides the pilot a desired course or track to the airport from the current location, cross track or deviation from the desired track, distance to the airport and current bearing to the airport. Pattern approach points are not preprogrammed in GPS units and although the approach points could be manually entered, it is not practical to do so. The location of the approach point would need to be calculated and than manually entered into the GPS.

Without a practical navigation aid, pilots are left to their own intuition and estimation on what course to fly in order to navigate to the pattern approach point. This imprecise navigation technique can result in one of several scenarios that could increase the chances of a collision with another aircraft in the congested airspace frequently encountered around airports. One scenario is that the pilot flies through the traffic pattern at an undesirable course while enroute to the traffic pattern entry approach point. Another scenario is that the pilot approaches the downwind leg at an intercept course substantially different than 45 degrees which reduces the pilot's ability to spot aircraft in the traffic pattern and or make a smooth pattern entry. Still another scenario is that an unseasoned pilot gets so overwhelmed with navigating to the pattern approach point that position announcements on the advisory frequency and or proper traffic scanning are neglected.

Figure 9:
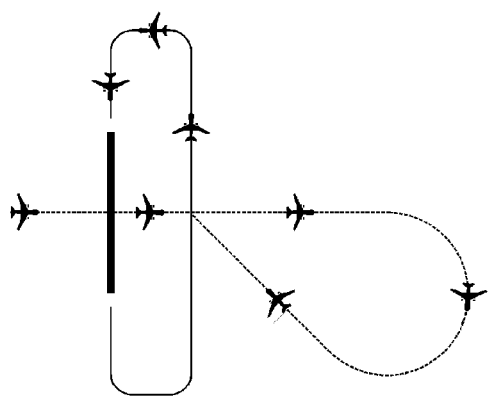

Some pilots navigate to the preferred traffic pattern entry approach point by first flying over the airport at least 500 feet above the traffic pattern altitude and then flying away from the airport on a course that will allow them to make a turn back towards the airport and make a proper preferred traffic pattern entry. This modified version of the preferred traffic pattern entry is called the "preferred entry-crossing midfield" (FIG. 9). While this is the preferred method of entering the traffic pattern for aircraft approaching the airport from the opposite side of the runway on a course that would result in the aircraft flying near the traffic pattern while navigating to the pattern approach point, for the majority of courses to the airport this method needlessly increases flying time and increases the chance of a collision with another aircraft as the pilot descends to pattern altitude and turns back toward the airport to make the preferred traffic pattern entry.

Figure 10:
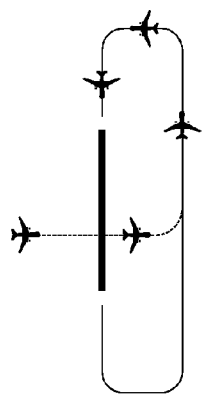
Figure 11:

In addition to the two versions of the preferred traffic pattern entry, there are two commonly used alternate traffic pattern entries used by pilots which are deemed acceptable under certain circumstances. The first alternate traffic pattern entry is called the "alternate midfield entry" (FIG. 10) which can be used in lieu of the preferred entry-crossing midfield. This pattern entry eliminates the excessive maneuvering in the congested airspace around airports required by the preferred entry-crossing midfield. The alternate midfield entry requires that the pilot cross the runway halfway between midfield and the departure end of the runway at pattern altitude and turn directly into the downwind leg. The second alternate traffic pattern entry is the "straight-in approach" (FIG. 11). This approach eliminates flying all legs of the pattern other than the final leg. The pilot should be established on final several miles from the airport.

The introduction of the alternate traffic pattern entries reveals another dilemma for the pilot approaching an uncontrolled airport. Which traffic pattern entry should be used? In addition to the aircraft's course to the airport, other factors going into this decision are the pilots personal preferences and experience level, volume of traffic expected at the airport, weather, nearby restricted airspace and obstructions.

Regardless of which of the four commonly used traffic pattern entries is selected, in order to make a proper traffic pattern entry, the pilot must navigate to a pattern approach point while remaining well clear of the traffic pattern until the traffic pattern is actually entered.

There are no known devices that will effectively assist pilots in selecting a traffic pattern entry or in navigating to a pattern approach point. There are traffic pattern computers marketed, but they only tell the pilot entry and pattern headings for the various legs of the traffic pattern. They do not provide pilots navigational guidance to the pattern approach point. Also, these devices only marginally assist pilots in selecting a traffic pattern entry. First, these devices do a very poor job helping the pilot to visualize the aircraft's position in relationship to the traffic pattern as the aircraft approaches the airport. The diagrams on these devises do not show to scale the aircrafts position in relationship to the traffic pattern when the aircraft is at distance from the airport that a pilot would normally break off direct to airport navigation and fly to a pattern approach point. Second, these devices do not provide any explicit guidance rather a given pattern approach point can be directly navigated to from the aircraft's current position without flying too close to the traffic pattern before actually entering the traffic pattern. The best example of these devices is U.S. Pat. No. 3,100,601 to Shapiro (1963). Other similar devices are U.S. Pat. No. 4,274,204 to Self (1981), and U.S. Pat. No. 2,996,242 to Bannister (1961).

OBJECTS AND ADVANTAGES

Accordingly, besides the objects and advantages of the of the traffic pattern computers previously described, several objects and advantages of the present invention are as follows:

(1) Provide the pilot with an accurate representation of the aircraft's position in relation to the runway and traffic pattern as the aircraft approaches any airport.
(2) Provide information to the pilot to assist in deciding which traffic pattern entry to make.
(3) Provide a course or track for the pilot to fly to navigate to the chosen pattern approach point while remaining well clear of the traffic pattern until the entry is actually made.
(4) Provide navigation data used in tandem with commonly provided navigation data on a GPS unit programmed for navigation direct to the airport of intended landing to assist the pilot remain on course to the pattern approach point.
(5) Provide navigation data used in tandem with commonly provided navigation data on a GPS unit programmed for navigation direct to the airport of intended landing to assist the pilot in determining when to turn towards the airport so that the traffic pattern can be precisely entered.

SUMMARY OF INVENTION

The computer is comprised of five connected discs which pivot independently about their center. Once side of the computer is used for left traffic runways and the other side is used for right traffic runways. The middle disc 50 (FIG. 4) is the same on both sides and serves as the rear disc for both the left and right traffic sides of the computer. Disc 50 has six concentric compass roses. Disc 30 (FIG. 5) is mounted in front of disc (50) and hides all the compass headings of the inner five compass roses on disc 50 except those revealed in slots 39–44. Disc 30 has a scale diagram of a runway 34, traffic pattern 33, and pattern approach points 36–38. The outer ring of disc 30 is navigation data 45–48 used to navigate to the approach points. Disc 20 (FIG. 6) is mounted in front of disc 30. Disc 20 hides all the navigation data on disc 30 except what is shown in slot 26 and hides all compass headings on the outer compass rose of disc 50 except what is shown in slot 21. Disc 20 has a clear center so that the diagram on disc 30 can be viewed. As the aircraft approaches the airport, disc 50 (FIG. 1), the rear disc, is rotated so that the runway heading is revealed in slot 40 of the middle disc 30. Disc 20, the front disc, is then rotated so that the direct course to the airport is revealed in slot 21. When the aircraft is at a specified distance from the airport, the navigation data revealed in slot 26 is then used to navigate to the approach point. Slots 39–43 then provide course guidance from the pattern approach point to the traffic pattern as well as course guidance to fly the traffic pattern.

DRAWINGS—FIGURES

Figure 1:
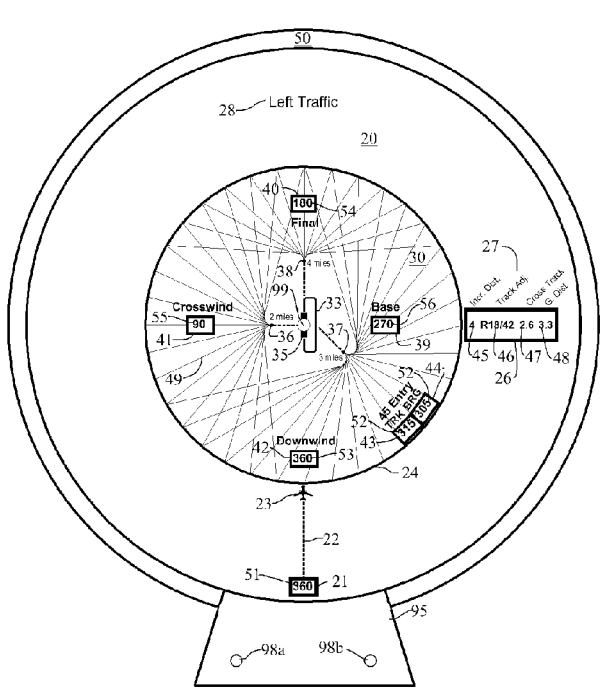
Figure 2:
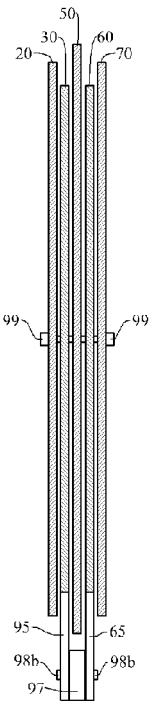
Figure 3:
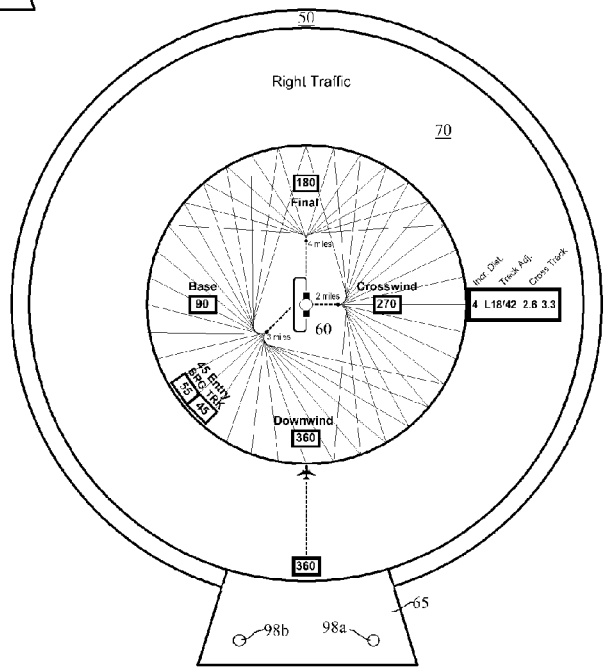
Figure 4:
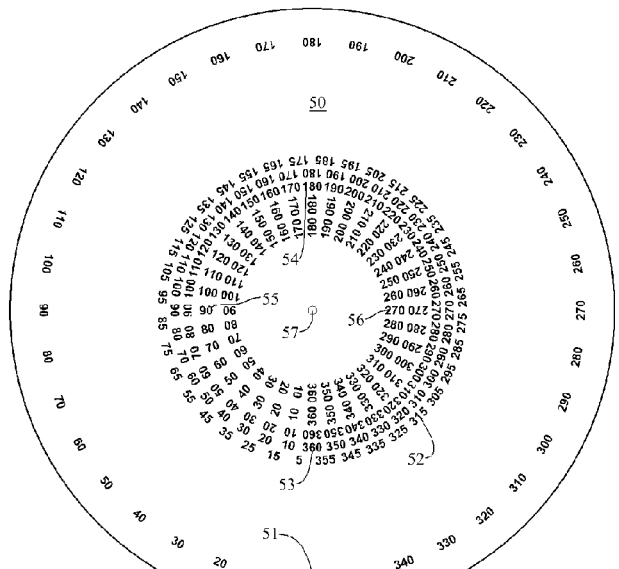
Figure 5:
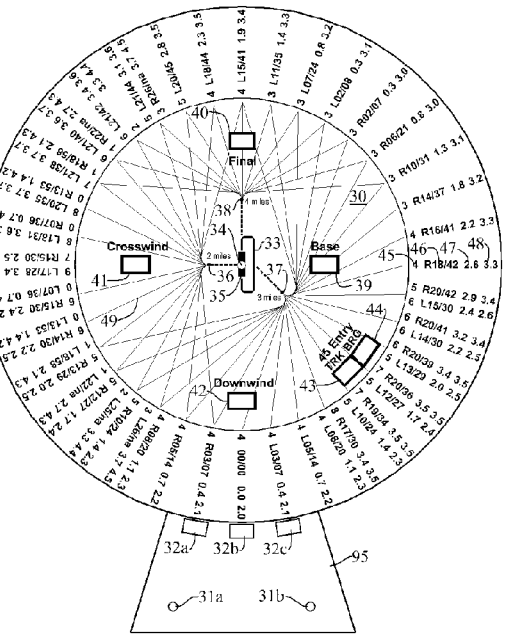
Figure 6:
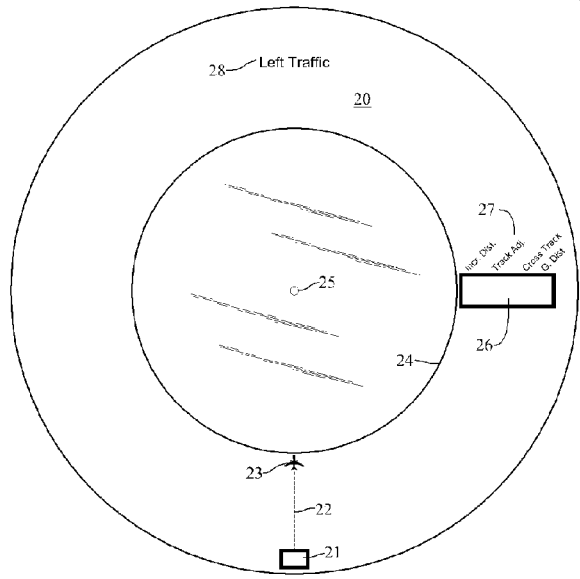
Figure 12:
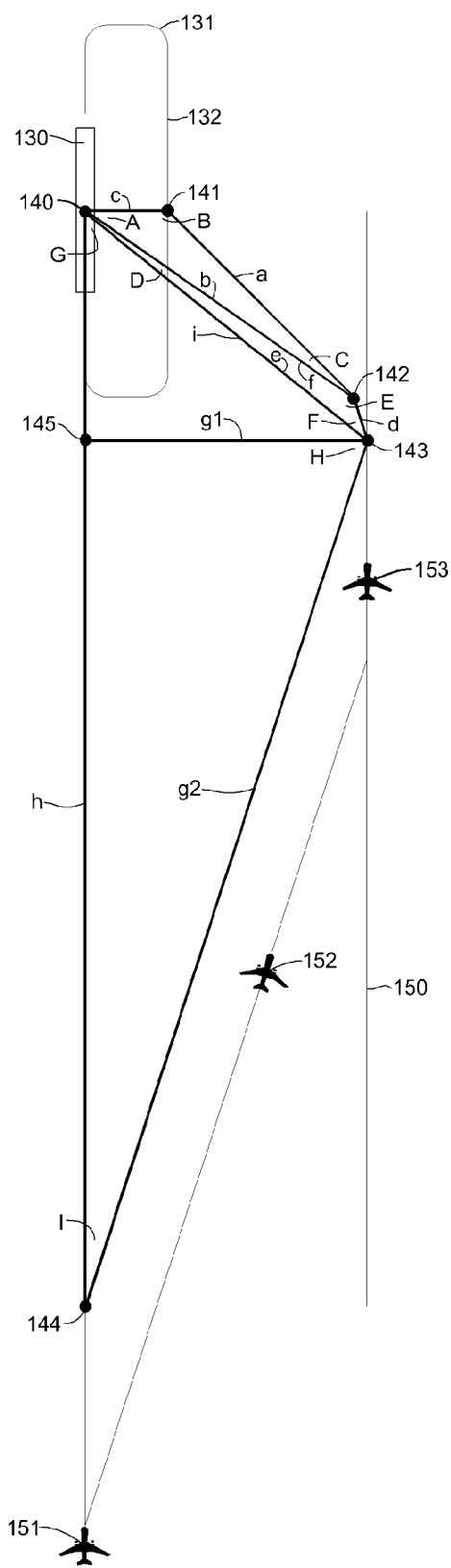

FIG. 1 is the front view of the computer.
FIG. 2 is the side view of the computer.
FIG. 3 is the rear view of the computer.
FIG. 4 is the third disc from the front of the computer.
FIG. 5 is the second disc from the front of the computer.
FIG. 6 is the first disc from the front of the computer.
FIG. 7 illustrates a left hand traffic pattern and the preferred traffic pattern entry.
FIG. 8 illustrates a right hand traffic pattern and the preferred traffic pattern entry.
FIG. 9 illustrates a left hand traffic pattern and the preferred entry-crossing midfield.
FIG. 10 illustrates a left hand traffic pattern and the alternate midfield entry.
FIG. 11 illustrates a left hand traffic pattern with a straight-in approach.
FIG. 12 illustrates an aircraft approach an airport with a left hand traffic pattern and making a preferred traffic pattern entry. This figure is illustrates the navigation data calculations.

DETAILED DESCRIPTION OF THE PREFERRED EMBODIMENT

The preferred embodiment of the computer is comprised of five plastic discs.

FIG. 1 shows the front view of the computer which is used for runways with left traffic. FIG. 3 shows the rear view of the computer which is used for runways with right traffic. As shown in FIG. 2, the five discs are attached at the center with grommet 99 or a similar fastening device which allows the discs to pivot about their center. Disc 20 (FIG. 6), disc 30 (FIG. 5), and disc 50 (FIG. 4) are utilized when using the left traffic side of the computer. Disc 70, disc 60, and disc 50 shown together on FIG. 3 are utilized when using the right traffic side of the computer. Note that disc 50 is the same on both sides and serves as the rear disc for both the left and right traffic sides of the computer. A separate fig for disc 60 is not provided as it is very similar to disc 30 (FIG. 5). Similarly, a separate fig for disc 70 is not provided as it is very similar to disc 20 (FIG. 6). The differences between these discs will be discussed later.

Disc 30 (FIG. 5) and disc 60 each have an extension or handle 95 and 65 respectively used to hold the computer and keep these two discs stationary while the remaining discs 20, 50 and 70 are free to rotate. In between handle 95 and handle 65 is a piece of plastic 97 as shown in FIG. 2. The two handles and piece of plastic are attached with grommets 98*a* and 98*b*.

Disc 20 (FIG. 6) is the first disc from the front side. This disc is made of a clear plastic. The inner circle 24 of the disc is clear while the outer ring defined by the area from the outside of circle 24 to the edge of the disc is printed with a solid color with the exception of slot 21 and slot 26. Slot 21 allows one number from the outermost circle of numbers 51 of the third disc 50 (FIG. 4) to be viewed. Slot 26 allows one set of navigation data 45 thru 48 to be viewed from disc 30 (FIG. 5). This navigation data is described by column headings 27 on disc 20 (FIG. 6). A dotted line 22 extends from slot 22 to an illustration of an airplane 23. There is a hole in the center of disc 20 for grommet 99. Caption 28 informs the user that the front view of the computer is used for left traffic. The only difference between disc 20 and disc 70 is caption 28. On disc 70, caption 28 informs the user that the rear side of the computer is used for right traffic.

Disc 30 (FIG. 5) is the second disc from the front side. This disc is made of a nontransparent plastic. At the center of disc 30 is a diagram of a runway 35 and left traffic pattern 33. Dot 37 represents the pattern approach point for the preferred entry and the attached dotted line represents the track flown from the pattern approach point to the traffic pattern. The distance from the pattern approach point to the center of the runway is provided next to dot 37. Dot 36 represents the pattern approach point for the preferred entry-crossing midfield as well as the midfield entry. The attached dotted line represents the initial path flown to enter the traffic pattern. The distance from this pattern approach point, dot 36, to the center of the runway is provided next to the dot. Dot 38 represents the pattern approach point for the straight-in approach with an attached dotted line representing the path flown to enter the traffic pattern. The distance from this pattern approach point, dot 38, to the center of the runway is provided next to the dot.

Disc 30 (FIG. 5) has six cutouts or slots which allows numbers from the concentric circles of numbers on disc 50 (FIG. 4) to be viewed. Slot 39 provides the base leg track by allowing one number from the innermost circle of numbers 56 on disc 50 (FIG. 4) to be viewed. Slot 40 provides the final approach leg track as well as the departure leg track by allowing one number from the third circle of numbers 54 on disc 50 (FIG. 4) to be viewed. Slot 40 also provides the track flown from the straight-in entry approach point 38 to the runway. Slot 40 also helps define the location of the straight-in entry approach point 38 by providing the bearing from the approach point to the center of the runway. Slot 41 provides the crosswind leg track by allowing one number from the second circle of numbers 55 on disc 50 (FIG. 4) to be viewed. Slot 41 also provides the track flown from the midfield entry approach point 36 to the traffic pattern. Slot 41 also helps define the location of the midfield entry approach point 36 by providing the bearing from the approach point to the center of the runway. Slot 42 provides the downwind leg track by allowing one number from the fourth circle of numbers 53 on disc 50 (FIG. 4) to be viewed. Slot 43 provides the track flown from the preferred entry approach point to the traffic pattern by allowing one number from the fifth circle of numbers 52 on disc 50 (FIG. 4) to be viewed. Slot 43 is located 45 degrees to the right of slot 42. Slot 44 provides the bearing from the preferred entry approach point to the center of the runway by allowing one number from the fifth circle of numbers 52 on disc 50 (FIG. 4) to be viewed. Slot 44 is located 55 degrees to the right of slot 42. Each leg in the left traffic pattern has a course or track 90 degrees to the left of the prior leg of the traffic pattern. This is illustrated by the by the numbers provided in the four slots 39, 40, 41, and 42 on FIG. 1. By definition, the preferred traffic pattern entry of left traffic patterns has a track 45 degrees to the left of the downwind leg. This is illustrated by comparing the downwind track provided in slot 42 on FIG. 1 to the preferred entry track provided in slot 43. Unlike the other two pattern approach points, the preferred entry approach point's bearing to the center of the runway is not the same as the track from the approach point to the traffic pattern. The reason for this is because the preferred entry track does not go thru the center of the runway. Hence, the bearing from the preferred entry approach point to the center of the runway provided in slot 44 must be calculated.

The bearing from the preferred entry approach point to the center of the runway is calculated as follows. The triangle defined by points 140, 141 and 142 on FIG. 12 is used to solve this equation. Side 'b', the distance from the preferred entry approach point 142 to the center of the runway 140, is a design parameter set at 3 miles. Side 'c', the distance from the center of the runway to preferred entry point 141, is a design parameter set at 0.75 miles. It is easily determined that angle 'b'=135 as by definition the preferred entry track, line 'a', intersects the downwind leg 132 at a 45 degree angle. The following formula derived from the Law of Sines is used to solve angle 'C'.

$$\text{Sin } C = (\text{Sin } B^* c)/b$$

$$\text{Sin } C = (\text{Sin } 135^* 0.75)/3$$

$$\text{Sin } C = (0.7071^* 0.75)/3$$

$$\text{Sin } C = 0.1768$$

$$C = \text{Arcsine } 0.1768$$

$$C = 10$$

Angle C is the difference between the preferred entry track represented by line 'a' and the bearing from the preferred entry approach point 142 to the center of the runway 140 represented by line 'b'. Therefore, the relative bearing from the preferred entry approach point 142 to the center of the runway 140 is ten degrees less than the preferred entry track. Accordingly, as shown in FIG. 1, the bearing value provided in slot 44 is always ten degrees less that the track value provided in slot 43.

Disc 30 (FIG. 5) has 36 sets of navigation data 45 thru 48 on the outer ring of the disc. The navigation data is used to navigate to the three pattern approach points 36, 37, and 38. The computer utilizes navigation data provided by a GPS unit programmed for navigation direct to the intended airport of landing to navigate to a pattern approach point. Triangulation is used to calculate the navigation data that allows this to be done. Course guidance is provided by assuming that direct to airport navigation is broken off for navigation to a pattern approach point when the airplane is ten miles from the airport. Accordingly, there are 36, "initial approach points" designated every ten degrees on a ten mile radius from the center of the runway. These initial approach points are represented by the intersections of course lines 49 and circle 24 shown on FIG. 1. The course lines 49 provide a graphical representation of the available courses from the initial approach points to the pattern approach points 36, 37, and 38. As the course lines show, only one pattern approach point may be navigated to from some initial approach points while up to three pattern approach points may be navigated to from other initial approach points. The lines are color coded by making all lines going to a given approach point the same color. Navigation data is calculated for each course from an initial approach point to a pattern approach point. Each navigation data set corresponds to an initial approach point 90 degrees to the left of the location of the data. FIG. 1 illustrates this point as the aircraft illustration 23 on disc 20 is 90 degrees to the left of slot 26 on disc 20 which allows one navigation data set 45 thru 48 on disc 30 to be viewed. Some data sets have two rows of numbers. Each row provides navigation guidance from the corresponding initial approach point to one pattern approach point. Each row of the navigation data 45 is color coded with the same colors as the course lines 49 to match the data with the courses. There is only one initial approach point that allows navigation to all three pattern approach points. Navigation data is only provided for two of the pattern approach points as space is limited to two rows. However, navigation data is not required to the third pattern approach point as the initial approach point is on course with the pattern approach point. Note that the area within circle 24 of disc 30 shown on FIG. 1 is a scale diagram of the ten mile radius around the runway. This diagram in conjunction with aircraft FIG. 23 provides the pilot with an orientation of the aircrafts position in relation to the runway, traffic pattern and approach points at the point direct to navigation is broken off for navigation to the selected pattern approach point.

We are now ready to explain how to calculate navigation data 45 to 48 shown in FIG. 5. The following formulas are used to calculate the values of all rows of navigation data 45 to 48 for both left and right traffic patterns. The row of navigation data 45 to 48 shown on FIG. 1 will be solved as the calculations are explained. It is important to note that the navigation data calculations are "relative" meaning they do not pertain to any specific bearings, courses or tracks but are rather based on the orientation of the initial approach points and pattern approach points relative to the runway and traffic pattern. For example, the aircraft illustration 23 on FIG. 1 is located at an initial approach point with a bearing to the airport which is equal to the course of the downwind leg irregardless of the course of the downwind leg. Another way to look at relative courses, tracks, and bearings is to assume that the approach point with a bearing to the airport equal to the runway heading has a 0 degree relative bearing. The approach point ten degrees to the left of the approach point with a 0 degree relative bearing has a ten degree relative bearing and so on. It is important to note that the specific location programmed into GPS units for single runway airports is the center of the runway and for multi-runway airports it is the location in the center of the runways. Accordingly, triangulation calculations are made based on GPS units providing a course to the center of the runway. FIG. 12 will be used to illustrate the navigation data calculations. Note that there will be several intermediary calculations made in addition to the actual navigation data calculations.

Proper use of the computer requires that specific courses be flown from the pattern approach points to the traffic pattern. Accordingly, turns need to be initiated prior to reaching the approach point at a location that allows the aircraft to role out of the turn on the indicated course at the approach point. This problem is solved by calculating and defining an individual location called "gate" for each course from an initial approach point to a pattern entry point. The course from the initial approach point is actually to the gate rather than the approach point. A turn towards the traffic pattern is initiated at the gate and ends at the approach point on the desired track to the traffic pattern. The position of the gate relative to the center of the runway will need to be determined. Before this can be done, the position of the gate relative to the pattern approach will need to be determined. The distance from the gate to the pattern approach point, represented by line 'd' on FIG. 12, is solved using the following formula derived from the property of Sines.

Distance from approach point to gate=Sin(degrees of turn/2)*Diameter of circle.

The "degrees of turn" is the number of degrees in the turn made at the gate. This turn is equal to the difference between the relative course from the initial approach point to the airport and the relative course from the pattern approach point to the traffic pattern. Although the navigation data calculations do not pertain to specific courses, the course values provided in slots 39, 40, 41, 42, 43, 44 and 51 can be used to calculate course differences as the differences are the same irregardless of the values provided in the slots. Slot 51 shows a course of 360 from the initial approach point to the airport and slot 43 shows a course of 315 from the preferred entry approach point to the airport. The course difference is calculated as follows: 360−315=45. Note that the course difference should always be positive and less than 180.

The "diameter of the circle" is an estimate of the diameter of a circle flown by aircraft expected to use the computer. Prior to calculating the diameter of the circle, the circumference must be calculated. The circumference of the circle is dependent on the aircraft's speed and time required to make a 360 degree turn. Since the computer is expected to be used by relatively slow general aviation aircraft, a speed of 100 knots per hour is assumed. As standard practice, aircraft usually make "standard rate turns" which take 2 minutes to complete a 360 degree turn. The circumference of the circle is calculated as follows:

Circumference=aircraft speed per hour*hours to complete 360 degree turn

Circumference=100*(2/60)

Circumference=3.33 knots

The diameter of the circle is calculated as follows:

Diameter=Circumference/Pi

Diameter=3.33/3.14

Diameter=1.06 knots

The distance from the pattern approach point 142 to the gate 143 defined by line 'd' is calculated using the following formula.

d=Sin(degrees of turn/2)*Diameter of circle d=Sin(45/2)*1.06 d=Sin(22.5)*1.06 d=0.3827*1.06 d=0.41 miles

The relative bearing from the pattern approach point to the gate is now calculated. The relative bearing from the pattern approach point to the gate will be defined by the angle between the course line 'a' from the pattern approach point 142 to the pattern entry point 141 and the line 'd' from the pattern approach 142 point to the gate 143. This angle is labeled 'CE' as the angle is divided by the angles 'C' and 'E' on FIG. 12. The relative bearing from the pattern approach point to the gate defined by angle 'CE' is calculated using the following formula.

CE=((180-degrees of turn)/2))+90

CE=((180−45)/2))+90

CE=158

The distance from the gate to the center of the runway, navigation data 48 shown on FIG. 1, is solved using the triangle defined by points 140, 142, and 143 on FIG. 12. Side 'f', the distance from the pattern approach point to the center of the runway, is a design parameter set at 3 miles. Side 'd', the distance from the pattern approach point to the gate, was previously calculated to be 0.41 miles. Angle 'E' can be easily calculated. Angle 'CE' was previously calculated to be 158. Angle 'C' was previously calculated to be 10. Since angle 'CE' is comprised of angle 'C' and angle 'E', 'E'='CE'−'C'. Angle 'E' is calculated as follows: 158−10=148. The following formula derived from the Law of Cosines is used to calculate the distance from the center of the runway 140 to the gate 143, side 'e'.

$e = \sqrt{(f^2 + d^2 - (2*f*d*\cos(E)))}$ $e = \sqrt{(3^2 + 0.41^2 - (2*3*0.41*\cos(148)))}$ $e = \sqrt{(9 + 0.168 - (2*3*0.41*-0.848))}$ $e = \sqrt{(11.26)}$ $e = 3.33$ miles Angle D, the difference between the relative bearing from the center of the runway 140 to the pattern approach point 142 and the relative bearing from the center of the runway 140 to the gate 143, is now calculated using the triangle defined by dots 140, 142 and 143. When angle D is solved the relative bearing of the gate to the center of the runway is solved as the relative bearing from the approach point to the center of the runway has already been solved. Side 'f', the distance from the pattern approach point to the center of the runway, is a design parameter set at 3 miles. Side 'e', the distance from the gate to the center of the runway was previously calculated to be 3.36 miles. Side 'd', the distance from the approach point to the gate, was previously calculated to be 0.41 miles. The following formula derived from the Law of Cosines is used to solve the angle 'D'.

$D = \text{ArcCos}((f^2 + e^2 - d^2)/(2*e*i))$ $D = \text{ArcCos}((3^2 + 3.36^2 - 0.41^2)/(2*3*3.36))$ $D = \text{ArcCos}(20.12/20.16)$ $D = \text{ArcCos}(0.998)$ $D = 4$ Angle 'G', the difference between the relative bearing from the initial approach point 144 to the center of the runway 140 and the relative bearing from the gate 143 to the center of the runway 140, can now be calculated. The angle comprising angle 'G' and angle 'D' is labeled angle 'GD'. Angle 'GD' is the difference between the relative bearing from the initial approach point 144 to the center of the runway 140 and the relative bearing from the pattern approach point 142 to the center of the runway 140. The relative bearing from the pattern approach point to the center of the runway was previously calculated and the relative bearing from the initial approach point to the center of the runway is a known value. Slot 51 on FIG. 1 shows a bearing of 360 from the initial approach point 144 to the center of the runway 140 and slot 44 shows a bearing of 305 from the pattern approach point 142 to the center of the runway 140. The bearing difference is calculated as follows: 360−355=55. Angle 'D' was previously calculated to be 4. Angle 'G' is calculated as follows.

$G = GD - D$ $G = 55 - 4$ $G = 51$

Line 'g2', the distance from the initial approach 144 to the gate 143, is now calculated using the triangle defined by points 140, 143, and 144. Line 'h', the distance from the initial approach point 144 to the center of the runway, is a design parameter set at 10 miles. Line 'i', the distance from the gate 143 to the center of the runway 140 was previously calculated to be 3.36 miles. Angle 'G', the difference between the relative bearing from the initial approach point 144 to the center of the runway 140 and the relative bearing from the gate 143 to the center of the runway 140 was previously calculated to be 51. The following formula derived from the Law of Cosines is used to calculate line 'g2'.

$g2 = \sqrt{(h^2 + i^2 - (2*h*i*\cos(G)))}$ $g2 = \sqrt{(10^2 + 3.36^2 - (2*10*3.36*\cos(51)))}$ $g2 = \sqrt{(100 + 11.29 - (2*10*3.36*0.629))}$ $g2 = \sqrt{(69)}$ $g2 = 8.31$ miles The "track adjustment", angle l, is now calculated using the triangle defined by points 140, 143, and 144. The track adjustment is navigation data 46 shown on FIG. 1. Line 'h', the distance from the initial approach point 144 to the center of the runway, is a design parameter set at 10 miles. Line 'i', the distance from the gate 143 to the center of the runway 140 was previously calculated to be 3.36 miles. Line 'g2', the distance from the initial approach point 144 to the gate 143, was previously calculated to be 8.31. The following formula derived from the Law of Cosines is used to calculate angle 'l'.

$I = \text{Arccosine}((h^2 + g^2 - i^2)/(2*h*g2))$ $I = \text{Arccosine}((10^2 + 8.31^2 - 3.36^2)/(2*10*8.31))$ $I = \text{Arccosine}(0.95)$ $I = 18$ As previously mentioned, navigation data 46 shown in FIG. 1 is the track adjustment. An "R" precedes the figure signifying that the course to the gate, line 'g', is to the right of the course direct to the center of the runway, line 'h'. An 'L' proceeds the figure when the course to the gate, line 'g', is to the left of the course direct to the center of the runway, line 'h'. The second value of navigation data 46, value following "/", provides a second course adjustment for use when the aircraft is five mile from the airport. This second adjustment is for backup use when a pilot neglects to adjust course at the initial approach point ten miles from the airport. This second course adjustment is calculated using the same formulas as the first course adjustment. The location of gate 143 is not changed. Line 'h' is changed from 10 miles to 5 miles. Line 'g2' is recalculated based on line 'h' changing to 5 miles. Angle "I" is then recalculated.

The "cross track", line 'g1' is now calculated using the right triangle defined by points 140, 143, and 145. The cross track is navigation data 47 shown on FIG. 1. Line 150 represents a course parallel to the course from the approach point 144 to the center of the runway. The distance between the two courses is the cross track represented by line 'g1'. Angle 'G', the difference between the relative bearing from the initial approach point 144 to the center of the runway 140 and the relative bearing from the gate 143 to the center of the runway 140 was previously calculated to be 51. Line 'i', the distance from the gate 143 to the center of the runway 140 was previously calculated to be 3.36 miles. Line 'g1' is solved using the following formula derived from the Pythagorean Theorem and the property of Sines.

$$g1 = \text{Sin}(G) * i$$

$$g1 = \text{Sin}(51) * 3.36$$

$$g1 = 0.777 * 3.36$$

$$g1 = 2.61$$

The "incremental distance" is now calculated. The incremental distance is navigation data 45 shown on FIG. 1. The incremental distance is the incremental distance flown per the course navigation provided by the computer from the initial approach point to the center of the runway versus the straight line distance from the initial approach point to the center of the runway. The base leg is a design parameter set at 0.75 miles. The final leg is a design parameter set at 0.75 miles. The runway length is a design parameter set at 1 mile. The remaining terms have been previously discussed and calculated.

$$\textit{Incr. Dist.} = g2 + (\text{degrees of turn}/360 * \text{circumference of circle}) + a + \text{base leg} + \text{final leg} * 2 + \text{runway length} - h$$

$$\textit{Incr. Dist.} = 8.31 + (45/360 * 3.33) + 2.43 + 0.75 + 0.75 * 2 + 1 - 10$$

$$\textit{Incr. Dist.} = 4.4 \text{ miles}$$

Since the route flown after arriving at the pattern entry point is different for each of the traffic pattern entries, the following formulas are also provided. The "alternate midfield entry" which utilizes pattern approach point 36 shown on FIG. 1 is as follows.

$$\textit{Incr. Dist.} = g2 + (\text{degrees of turn}/360 * \text{circumference of circle}) + a - \text{base leg} + \text{final leg} * 3 + \text{runway length} - h$$

The "straight-in approach" which utilizes pattern approach point 38 shown on FIG. 1 is as follows.

$$\textit{Incr. Dist.} = g2 + (\text{degrees of turn}/360 * \text{circumference of circle}) + a - h$$

This concludes the navigation data calculations.

Referring now to FIG. 5, handle 95 is an extension of disc 30 (FIG. 5). Slots 32a, 32b, and 32c keep all numbers from the outermost circle of numbers 51 on disc 50 (FIG. 4) from being blocked from view by the handle 95 of disc 30 (FIG. 5). There are two holes 31a and 31b on the handle 95 of disc 30 (FIG. 5) for grommets 98a and 98b. There is a hole in the center of disc 30 (FIG. 5) for grommet 99.

Disc 60 shown on FIG. 2 and FIG. 3 is the same as disc 30 (FIG. 5) with the following exceptions. Disc 60 has an illustration of a right traffic pattern as opposed to disc 30 which has an illustration of a left traffic pattern. For disc 60 as compared to disc 30 (FIG. 5), the Crosswind Leg slot 41 is swapped with the Base Leg slot 39. On disc 60 compared to disc 30 (FIG. 5), slot 43 is 45 degrees to the left of slot 42 as opposed to 45 degrees to the right. On disc 60 compared to disc 30 (FIG. 5), slot 44 is 55 degrees to the left of slot 42 as opposed to 55 degrees to the right. For disc 60 the navigation data will be different than the navigation data 45 thru 48 on disc 30 (FIG. 5) requiring separate calculations using the same formulas.

Disc 50 (FIG. 4) is the third disc from the front as well as the rear. The disc is made of a nontransparent plastic. Both sides of the disc are used and the two sides are identical. Each side of the disc contains six concentric circles of 36 numbers. Each of the four innermost circles of numbers 56, 55, 54, and 53 is comprised of a compass rose with ten degree increments. Each circle of numbers is oriented in a manor so that the numbers made visible by the respective slots 39, 41, 40, and 42 on disc 30 (FIG. 5) all have the same orientation. Going from the innermost circle out, the first circle 56 is the base leg track, circle 55 is the crosswind leg track, circle 54 is the final approach track, and circle 53 is the downwind leg track. The fifth circle of numbers 52 is also a compass rose with ten degree increments. This compass rose differs from the other compass roses in that each number ends in five rather than zero. This circle of numbers is used for the preferred traffic pattern entry track as well as the bearing to the airport from the "preferred traffic entry approach point" which are made visible by slot 43 and slot 44 on disc 30 (FIG. 5). The outermost circle of numbers 51 or compass rose displays the aircrafts direct course the airport rounded to the nearest ten degrees. One number from this circle is made visible by slot 21 on disc 20 (FIG. 6).

OPERATION OF THE PREFERRED EMBODIMENT

The computer provides several functions to help pilots safely and precisely approach, enter and fly the traffic pattern of uncontrolled airports. The computer utilizes navigation data provided by a GPS unit programmed direct to the airport of intended landing. The computer provides a to scale visual representation of the airplanes position in relation to the runway, traffic pattern and pattern approach points at the point navigation to a pattern approach point is initiated. The computer identifies the feasible traffic pattern entries given the runway heading, traffic pattern direction, and the airplane's bearing to the airport. The computer provides the course or track to fly to the pattern approach point of the selected traffic pattern entry. The computer provides a simulated "course deviation indicator" to aid in accurate navigation to the selected approach point. The computer provides a turn indicator telling the pilot when to initiate a turn from the initial approach track towards the traffic pattern enabling the aircraft to precisely role out of the turn on the indicated track to the traffic pattern at the pattern approach point. The computer provides the track to fly from the pattern approach point to the traffic pattern. Finally, the computer provides the track to fly for each of the legs of the traffic pattern.

First, when approximately fifteen miles or further from the airport, determine which runway will be utilized and if the runway has either a left traffic pattern or a right traffic pattern. Runways are identified by numbers which are derived by rounding the compass heading down the runway, to the nearest ten degrees and then dividing by 10. The runway number identifies the actual runway as well as the direction of travel down the runway. For example a runway with a compass heading of 183 down the runway would be runway 18. The same runway used in the opposite direction would be runway 36. The traffic pattern direction simply stipulates the direction of turns in the traffic pattern. Hence, "left traffic" means all turns in the traffic pattern are to the left and "right traffic" means all turns in the traffic pattern are to the right. An example will be worked as the operation of the computer is described. The example will be an approach to runway 18 with a left traffic pattern.

Second, the GPS unit is setup for use with the computer. The GPS is programmed for course guidance direct to the airport of intended landing. This is an extremely easy and common GPS feature that any pilot who uses GPS is familiar with. Under most circumstances, the GPS unit will have already been programmed for course guidance to the airport of intended landing and the pilot will simply need to hit a couple buttons to setup the GPS. This action creates a "desired track" in the GPS which is a course from the aircraft's current position to the center of the runway. A desired track of 356 is used for the example flight. The distance an aircraft is off the desired track is referred to as "cross track". Similarly, cross track can be used to define a line running parallel to the desired track as illustrated by line 'h', desired track, and line '150', cross track, on FIG. 12. The cross track value defines the distance from the desired track to the parallel cross track line. The cross track line serves as an alternate course which can be used to navigate to the approach point. Other navigation data commonly provided by GPS units programmed for course guidance direct to an airport that will be utilized include track, distance to the airport, and bearing to the airport. Track is the actual compass direction of movement over the ground. Distance to the airport is the distance from the aircraft to the center of the runway. Bearing to the airport is the compass direction from the aircraft to the center of the runway.

Third, the computer is setup. The computer is rotated to the side that matches the traffic pattern turns marked by description 28 as shown on FIG. 1. Next, the third disc 50 is rotated to match the number in the final approach slot 40 to the runways compass heading. From a prior discussion, it was shown that runway 18 has a compass heading rounded to the nearest ten degrees of 180. Accordingly, disc 50 is rotated so that 180 appears in the final approach slot 40 as illustrated by FIG. 1. The front disc 20 is rotated so that the number in slot 21 on disc 20 is equal to the desired track to the airport as provided by the GPS unit rounded to the nearest ten degrees. Since a desired track of 356 was assumed for the example flight, the front disc 20 is rotated so that the number 360 appears in slot 21 as shown in FIG. 1. Note that the initial approach points previously discussed are not actually flown to. The navigation data of the initial approach point nearest the aircrafts location will be used to navigate to a pattern approach point.

Fourth, determine which traffic pattern entry and corresponding approach point will be utilized. As previously mentioned, the runway heading, traffic pattern direction, and the airplanes direct course to the airport determines which traffic pattern entries are available. Note that at least one pattern approach point will always be available and that maximum of three pattern approach points may be available. Since pattern approach point 36 shown on FIG. 1 serves two traffic pattern entries, there will always be at least one traffic pattern entry available and a maximum of four traffic pattern entries may be available to choose from. A given traffic pattern entry is shown to be available if there is an approach course line 49 running from the aircraft illustration 23 to the corresponding approach point, dots 36, 37, and 38. For the example flight, FIG. 1 shows that only the preferred traffic pattern entry is available as only approach point 37 can be used. The approach course lines 49 and corresponding navigation data 45 thru 48 are color coded to link the course lines and navigation data when more than one approach point can be flown to from a given initial approach point. The first column of data 45 provides the incremental distance beyond the direct to airport distance to be flown for the corresponding traffic pattern entry. This distance information may be used to help decide which traffic pattern entry and corresponding approach point to utilize when more than one option is available.

Fifth, use the computer to calculate the course to fly to the pattern approach point. The first value of navigation data 46 on FIG. 1 provides a course adjustment from the desired track direct to the airport to the course to the chosen pattern approach point. Note that the course adjustment provided assumes that direct to airport navigation is broken off for navigation to the approach point when the aircraft is ten miles from the airport and on the desired track direct to the airport. The letter R or letter L is at the beginning of each navigation data 46 and stipulates rather the course adjustment is to the right or to the left of the desired track direct to the airport. The course to the approach point is calculated by adding course adjustments starting with R and subtracting course adjustments starting with L to the desired track direct to the airport. Accordingly, for the example flight, the course to the pattern approach point 37 is calculated as follows: 356+18=14. Note that if the result is above 360, 360 is subtracted from the result. The second value of navigation data 46, value following "/", provides a second course adjustment for use when the aircraft is five mile from the airport. This second adjustment is for backup use when a pilot neglects to adjust course by ten miles. Additionally, both course adjustment figures can be used to interpolate course adjustment figures for use at distances between ten and five miles from the airport.

Sixth, fly to the approach point. It is actually recommended that direct to airport navigation be broken off for navigation to the pattern approach point gate when approximately twelve miles from the airport. This allows a specified cross track to be intercepted prior to reaching the pattern approach point gate. As previously mentioned, cross track is the distance the aircraft is off the desired track. The cross track can be used to provide an alternate course running parallel to the desired track direct to the airport. The cross track also serves as a "simulated course deviation indicator" for the alternate course. Once the specified cross track is intercepted, the aircraft is turned back to the original desired course direct to the airport and the alternate course defined by the cross track is flown to the pattern approach point gate. The aircraft illustrations 151, 152 and 153 on FIG. 12 shows an aircraft turning to the specified course, intercepting the cross track and flying the alternate course provided by the cross track to the pattern approach point gate. GPS units also continuously provide the distance direct to the airport. Together, the cross track and distance to the airport are used to define the position of the gate being flown to. On FIG. 1 navigation data 47 provides the specified cross track and navigation data 48 provides the specified distance. Accordingly, for the example flight, the cross track is 2.6 miles and the distance to the airport at the pattern approach point gate is 3.3 miles. When the GPS indicates twelve miles to the airport, a course adjustment is made to the right which provides a track per the GPS of 14. The track is held until the GPS indicates a cross track of 2.6 at which time a turn to the left to the original track of 356 is made. The cross track of 2.6 is maintained until the GPS shows a distance of 3.3 miles to the airport at which time a standard rate turn is initiated to the designated track to the traffic pattern. The designated track to the traffic pattern is provided in slot 43 shown in FIG. 1 which is 315 for the example flight. The pattern approach point location is defined by the distance direct to the center of the runway provided next to the pattern approach point 37 and the bearing to the center of the runway provided in slot 44. For the example flight, the pattern approach point is 3 miles from the center of the runway with a bearing of 305 degrees to the center of the runway. When the turn to the specified track to the traffic pattern is rolled out of, these two figures can be compared to the corresponding figures on the GPS unit to verify that the aircraft is close to the pattern approach point.

Seven, enter and fly the traffic pattern. Fly the traffic pattern legs as shown by the traffic pattern illustration 33 on FIG. 1. The required track for each of the four legs is provided in slots 39, 40, 41, and 42. For the example flight, a turn will be made to the downwind track of 360 as provided in slot 42 followed by a turn to a track of 270 as provided in slot 56 followed by a turn to the final approach track of 180 provided in slot 40.

ALTERNATE EMBODIMENT

An alternate embodiment is an electronic or software version of the traffic pattern approach computer. The actual distance and bearing to the airport, runway number, traffic pattern direction, and aircraft speed is entered into the computer and the formulas outlined in the preferred embodiment are used to calculate the navigation data. The navigation data output from the computer would be the same data provided by navigation data 45 to 48 shown on FIG. 1 with the exception that the electronic version would provide the track to the approach point rather than a track adjustment. This is possible since the actual bearing to the airport is entered by the user. The computer also provides the compass headings of the four traffic pattern legs and the preferred entry track, slots 39 to 43 on FIG. 1. The electronic version is more flexible as the user can begin flying to the pattern approach point at any distance from the airport. The user can also change the distance from the airport of the pattern approach points. The software version could be used in a stand alone device, palm type handheld computer, tablet pc, laptop pc, etc.

What is claimed is:

1. A handheld mechanical computer which works in tandem with an onboard GPS unit programmed for navigation direct to the airport of intended landing that employs triangulation so that an alternate point can be navigated to from which a proper traffic pattern entry can be made comprising:
   (1) means for calculating standard navigation data utilizing the concept of relative bearings and relative courses as described in the preferred embodiment comprising:
      (a) creating a model approach scenario by:
         (1) designating the distance and relative bearing from the airport of at least one point from which a proper traffic pattern entry can be made called pattern approach point,
         (2) designating the distance and relative bearing from the airport of a multitude of points around the airport with an equal distance from the airport called initial approach points,
         (3) designating which said pattern approach points may be flown to from which said initial approach points thereby defining relative approach courses for said model,
      (b) calculating said navigation data utilizing triangulation for each of the said relative approach courses, said navigation calculations include at least a course adjustment which is the difference between the relative course from the initial approach point to the airport and the relative course from the initial approach point to the pattern approach point,
   (2) a disc with a compass rose with a plurality of equally spaced compass headings,
   (3) a second disc with a circle of said navigation data placed on said disc so that said navigation data are systematically linked to the corresponding said relative initial approach points and said relative approach courses,
   (4) means for connecting said two discs that allows said discs to pivot independently of each other,
   (5) means for all compass headings from said compass rose on first said disc and all said navigation data on said second disc to be simultaneously viewed,
   (6) a marked location on said disc 2 used to align a single compass heading from said compass rose from said disc 1 closest to the runway heading of the airport of intended landing to linking each said compass heading from said disc 1 with a set of said navigation data from said disc 2 whereby said navigation data linked to the compass heading closest to the aircrafts actual bearing to the airport is used to navigate to said pattern approach point when the aircraft is the specified distance from the airport.

2. The computer of claim 1 wherein said means for connecting said two discs that allows said discs to rotate independently of each other is a hole punched in the center of said discs with a connecting device running thru the holes.

3. The computer of claim 1 wherein said means for all compass headings from said compass rose on first said disc and all said navigation data on said second disc to be simultaneously viewed is said disc 2 is mounted in front of said disc 1, the diameter of said disc 1 is larger than the diameter of said disc 2 and the diameter of said compass rose on said disc 1 is larger than the diameter of said disc 2.

4. The computer of claim 1 further including additional navigation data included on said disc 2 designating the location of a gate for each said approach course which is calculated by said method for calculating standard navigation data, said gate indicates the position that the turn towards the traffic pattern should be started whereby the turn ends on the prescribed track to the traffic pattern at the approach point.

5. The computer of claim 4 further including additional navigational data included on said disc 2 designating a cross track value of the course direct to the airport for each said approach course which is calculated by said method for calculating standard navigation data, said cross track value is used to create a simulated course deviation indicator whereby course guidance is provided so that the gate can be precisely flown to.

6. The computer of claim 3 wherein:
   (1) said compass rose on said disc 1 is comprised of 36 compass headings with ten degree increments with said headings ending in zero and is located close to the outer edge of said disc,
   (2) said disc 1 has at a second compass rose with 36 compass headings in ten degree increments with said headings ending in zero and located inside said first compass rose,
   (3) said disc 1 has a third compass rose with 36 compass headings in ten degree increments with said headings ending in five and located inside said first compass rose,
   (4) said disc 2 has four slots that provide the magnetic courses of the four traffic pattern legs by showing one said compass heading from said second compass rose on said disc 1 in each of said slots on said disc 2, (5) said disc 2 has a fifth slot that provides the magnetic course for the preferred traffic pattern entry by revealing one compass heading from said third compass rose on said disc 1.

7. The computer of claim 6 further including three additional compass roses with 36 compass headings in ten degree increments with said headings ending in zero whereby making each said compass heading revealed in each of the four said slots on said disc 2 that provide the magnetic courses of the four traffic pattern legs to have the same orientation.

8. The computer of claim 6 wherein said disc 2 has a scale diagram of the circular area bounded by said initial approach points which includes a scale representation of the runway, traffic pattern, and said pattern approach points whereby the pilot can easily visualize the aircrafts position relative the airport and traffic pattern when the aircraft is at the distance from the airport when direct to airport navigation is broken off for navigation to said pattern approach point.

9. The computer of claim 8 wherein said disc 2 has lines drawn from outer boundary of said circular area on disc 2 to the pattern approach points representing said relative approach courses whereby the pilot can easily visualize which said relative approach courses are available given the aircrafts relative bearing to the airport.

10. The computer of claim 8 further including a third disc mounted in front of said disc two with said connecting device wherein:
    (1) said disc 3 pivots about its center independently from the other discs,
    (2) said disc 3 has a diameter at least as large as the diameter of said disc 2,
    (3) said disc 3 is composed of a clear material that allows said diagram on said disc 2 as well as said five slots on disc 2 to be viewed,
    (4) said disc 3 is modified so that the outer ring of said disc 3 is not transparent except for a single slot so that all said course adjustments are blocked from view except for one set,
    (5) means to align said disc 3 with the compass heading of said outer compass rose of said disc 1 that is closest to the aircrafts bearing to the airport whereby the corresponding said navigation data are made visible thru said slot on said disc 3.

11. The computer of claim 10 wherein said means to align said disc 3 with the compass heading of said outer compass rose of said disc 1 that is closest to the aircrafts bearing to the airport is:
    (1) the diameter of said disc 3 is larger than the diameter of said outer compass rose of said disc 1 but smaller than the diameter of said disc 1,
    (2) said disc 3 has a second slot that reveals a single compass heading from said outermost compass rose on said disc 1 with said slot positioned on said disc 3 so that the corresponding navigation data on said disc 2 is made visible thru said slot 1 of said disc 3.

12. The computer of claim 10 further including:
    (1) the duplication of said compass roses on said disc 1 on the reverse side of said disc 1,
    (2) the addition of a fourth disc mounted in front of said disc 1 on the opposite side of said disc 2 and said disc 3, said disc 4 is similar to said disc 2 but has a diagram of the opposite direction traffic pattern than said disc 2, also, the navigation data on said disc 4 are separately calculated using said method for calculating standard navigation data,
    (3) the addition of a fifth disc mounted in front of said disc 5 which is the same as said disc 3 with the exception of a traffic pattern designation which is the opposite of similar designation on said disc 3 whereby the computer will work for both left and right traffic patterns.

13. The computer of claim 12 further including:
    (1) handles extending from said discs 2 and 4,
    (2) each said handle has enough slots so that no said compass headings on the outer compass rose on either side of said disc one is blocked from view,
    (3) said handles are fastened at the base of the handles whereby discs 2 and 4 will remain stationary while the remaining discs are pivoted.

14. A method for navigating to a point from which a proper traffic pattern entry can be made utilizing an onboard GPS unit programmed for navigation direct to the airport of intended landing comprising:
    (1) a method for calculating standard navigation data utilizing the concept of relative bearings and relative courses as described in the preferred embodiment comprising:
       (a) creating a model approach scenario by:
          (1) designating the distance and relative bearing from the airport of at least one point from which a proper traffic pattern entry can be made called pattern approach point,
          (2) designating the distance and relative bearing from the airport of a multitude of points around the airport with an equal distance from the airport called initial approach points,
          (3) designating which said pattern approach points may be flown to from which said initial approach points thereby defining relative approach courses for said model,
       (b) calculating said navigation data utilizing triangulation for each of the said relative approach courses, said navigation calculations include at least a course adjustment which is the difference between the relative course from the initial approach point to the airport and the relative course from the initial approach point to the pattern approach point,
    (2) a step that use a means for storing said navigation data and relating said navigation data to the corresponding said relative approach course for use during flight,
    (3) a step that use a means to determine the aircrafts relative bearing to the airport based on the aircraft's actual bearing to the airport and the runway number whereby the linked navigation data can be used to adjust course so that said pattern approach point can be flown to.

15. The method of claim 14 further including additional navigation data designating the location of a gate relative to the airport for each said approach course which is calculated by said method for calculating standard navigation data, said gate indicates the position that the turn towards the traffic pattern should be started wherein the turn ends on the prescribed track to the traffic pattern at the approach point.

16. The method of claim 15 further including additional navigational data designating a cross track value of the course direct to the airport for each said approach course which is calculated by said method for calculating standard navigation data, said cross track value is used to create a simulated course deviation indicator wherein course guidance is provided so that the gate can be precisely flown to.

* * * * *